United States Patent
Taguchi et al.

(10) Patent No.: US 6,584,210 B1
(45) Date of Patent: Jun. 24, 2003

(54) DIGITAL WATERMARK IMAGE PROCESSING METHOD

(75) Inventors: Jun'ichi Taguchi, Sagamihara (JP); Hiroshi Yoshiura, Tokyo (JP); Isao Echizen, Yokohama (JP); Akira Maeda, Yokohama (JP); Takao Arai, Yokohama (JP); Toshifumi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/274,103

(22) Filed: Mar. 23, 1999

(30) Foreign Application Priority Data

Mar. 27, 1998 (JP) .......................................... 10-080815

(51) Int. Cl.[7] ................................................ G06K 9/00
(52) U.S. Cl. ........................................ 382/100; 713/176
(58) Field of Search ................................ 382/100, 235, 382/244, 254; 235/469; 713/176

(56) References Cited

U.S. PATENT DOCUMENTS

| | | |
|---|---|---|
| 5,530,759 A | 6/1996 | Braudaway et al. |
| 5,561,724 A | 10/1996 | Kido et al. |
| 5,568,570 A | 10/1996 | Rabbani ..................... 382/238 |
| 5,606,609 A | 2/1997 | Houser et al. |
| 5,636,292 A | 6/1997 | Rhoads |

(List continued on next page.)

FOREIGN PATENT DOCUMENTS

| | | |
|---|---|---|
| EP | 0581317 | 2/1994 |
| EP | 0612054 | 8/1994 |
| EP | 0651554 | 5/1995 |
| EP | 0766466 | 4/1997 |
| EP | 805600 | 11/1997 |
| EP | 840513 | 5/1998 |
| EP | 0901276 | 3/2001 |
| JP | 66329 | 1/1994 |
| JP | 8161483 | 6/1996 |
| JP | 9130766 | 5/1997 |
| JP | 9238031 | 9/1997 |
| WO | 9520291 | 7/1995 |
| WO | 9625005 | 8/1996 |
| WO | 9636163 | 11/1996 |
| WO | 9641468 | 12/1996 |
| WO | 9714249 | 4/1997 |
| WO | 9827510 | 6/1998 |

OTHER PUBLICATIONS

JPEG Compression: "Digital Compression and Continuous–Tone Stilt Images", ISO/IEC/0918–1.

(List continued on next page.)

Primary Examiner—Jayanti K. Patel
Assistant Examiner—Barry Choobin
(74) Attorney, Agent, or Firm—Antonelli, Terry, Stout & Kraus, LLP

(57) ABSTRACT

An image processing apparatus having an adding unit to add information by changing a data value of image data and a detecting unit to detect the information added to the image data. In a digital watermark image processing method in the image processing apparatus, filter passage image data is formed by performing an image filtering process to original image data, watermark core image data is formed by performing a process to obtain a difference between the filter passage image data and the original image data, change amount image data is formed by performing a process to obtain a value to change the data value of the image data on the basis of the watermark core image data and desired information to be added, and watermark inserted image data is formed by performing a process to add the original image data and the change amount image data.

12 Claims, 8 Drawing Sheets

U.S. PATENT DOCUMENTS

| | | | |
|---|---|---|---|
| 5,721,788 A | 2/1998 | Powell et al. | 382/100 |
| 5,737,417 A | 4/1998 | Buynak et al. | |
| 5,748,763 A | 5/1998 | Rhoads | |
| 5,778,064 A | 7/1998 | Kori et al. | 380/5 |
| 5,799,111 A * | 8/1998 | Gussin | 382/254 |
| 5,822,425 A | 10/1998 | Ezaki et al. | |
| 5,848,155 A | 12/1998 | Cox | |
| 5,859,920 A | 1/1999 | Daly et al. | |
| 5,889,868 A | 3/1999 | Moskowitz et al. | |
| 5,896,454 A | 4/1999 | Cookson et al. | 380/5 |
| 5,905,819 A | 5/1999 | Daly | 382/284 |
| 5,915,027 A | 6/1999 | Cox et al. | 380/54 |
| 5,930,369 A * | 7/1999 | Cox et al. | 380/54 |
| 5,949,055 A * | 9/1999 | Fleet et al. | 235/469 |
| 5,960,081 A | 9/1999 | Vynne et al. | 380/10 |
| 6,005,643 A | 12/1999 | Morimoto et al. | |
| 6,061,793 A * | 5/2000 | Tewfik et al. | 713/176 |
| 6,069,914 A | 5/2000 | Cox | 375/150 |
| 6,101,602 A * | 8/2000 | Fridrich | 713/176 |
| 6,104,826 A | 8/2000 | Nakagawa et al. | 382/100 |
| 6,141,446 A * | 10/2000 | Boliek et al. | 382/233 |
| 6,212,325 B1 | 4/2001 | Kori | 386/1 |
| 6,240,121 B1 | 5/2001 | Senoh | 375/130 |
| 6,259,801 B1 * | 7/2001 | Wakasu | 382/100 |
| 6,285,775 B1 * | 9/2001 | Wu et al. | 382/100 |

OTHER PUBLICATIONS

Bors and Pitas: Image Watermarking using DCT Domain Constraints Proceeding of 3rd IEEE International Conference on Image Processing, Sep. 16–19, 1996, pp. 231–234.

Nikkei Electronics Feb. 24, 1997 (683) pp. 99–107 "Digital Watermark protects multi–media age".

W. Pennebake et at, "Still Image Data Compression Standard" JPEG, pp. 335–353.

"Still Image Data Hiding in Pixel Blocks", Shimizu et at, In Proc. Of IPSJ 53~ Annual Conference 1996.

"Data Hiding Technology for Supporting Electronic Water Mark (Upper)", pp. 149–162, Nikkei Electronics Feb. 24, 1997 (No. 683), by Nikkei Business Pub., Inc.

G. Caronni, "Assuring Ownership Rights for Digital Images" Published in the proceedings of 'reliable IT systems' VIS '95, edited by Brueggemann, H.H. and Gerhardt–Haeckl, W. Vieweg Publishing Company, Germany 1995, pp. 1–10.

O. Ruanaidh, "Watermarking digital images for copyright protection" IEEE Proceedings on Vision, Signal and Image Processing, vol. 143, No. 4, 1996, pp. 250–256.

Bender et at, Techniques for Data Hiding, IBM Systems Journal, vol. 35, Nos. 3 & 4, 1996, pp. 313–335.

K. Kido, et at "Improvement of MRI Image Quality by a Directional Adaptive Filter", Systems and Computers in Japan, vol. 28, No. 10, 1997, 99–69–76.

Papers of IEICE of Japan, D–II vol. J79–D–II, No. 8, pp. 1347–1353.

W. Bender, et at "Data Hiding Technology for Supporting Electronic Watermark (Upper)" Nikkei Electronics, No. 683, Feb. 24, 1997, pp. 149–162.

S. Shimizu, et at "Pixel Block Coding for Digital Still Images", IBM Japan, Ltd., Tokyo Research Lab. pp. 257–258.

* cited by examiner

FIG.9

| 0 | 0 | 0 | 0 | 0 | 0 | 0 |
|---|---|---|---|---|---|---|
| 0 | 0 | 1 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 1 | 0 | 0 |
| 0 | 0 | 0 | 0 | 0 | 0 | 0 |

FIG.10

| 0 | 2 | 2 | 2 | 0 | 0 | 0 |
|---|---|---|---|---|---|---|
| 0 | 2 | 1 | 2 | 0 | 0 | 0 |
| 0 | 2 | 2 | 2 | 0 | 0 | 0 |
| 0 | 0 | 0 | 0 | 0 | 0 | 0 |
| 0 | 0 | 0 | 2 | 2 | 2 | 0 |
| 0 | 0 | 0 | 2 | 1 | 2 | 0 |
| 0 | 0 | 0 | 2 | 2 | 2 | 0 |

FIG.11

| 0 | 0 | 0 | 0 | 0 | 0 | 0 | 0 | 0 | 0 | 0 |
|---|---|---|---|---|---|---|---|---|---|---|
| 0 | 0 | 1 | 1 | 0 | 0 | 0 | 0 | 0 | 0 | 0 |
| 0 | 0 | 1 | 1 | 0 | 0 | 0 | 0 | 1 | 1 | 0 |
| 0 | 0 | 0 | 0 | 0 | 0 | 0 | 0 | 1 | 1 | 0 |
| 0 | 0 | 0 | 0 | 0 | 0 | 0 | 0 | 0 | 0 | 0 |
| 0 | 0 | 0 | 0 | 1 | 1 | 0 | 0 | 0 | 0 | 0 |
| 0 | 0 | 0 | 0 | 1 | 1 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG.12

| 0 | 2 | 2 | 2 | 2 | 0 | 0 | 0 | 0 | 0 | 0 |
|---|---|---|---|---|---|---|---|---|---|---|
| 0 | 2 | 1 | 1 | 2 | 0 | 0 | 2 | 2 | 2 | 2 |
| 0 | 2 | 1 | 1 | 2 | 0 | 0 | 2 | 1 | 1 | 2 |
| 0 | 2 | 2 | 2 | 2 | 0 | 0 | 2 | 1 | 1 | 2 |
| 0 | 0 | 0 | 2 | 2 | 2 | 2 | 2 | 2 | 2 | 2 |
| 0 | 0 | 0 | 2 | 1 | 1 | 2 | 0 | 0 | 0 | 0 |
| 0 | 0 | 0 | 2 | 1 | 1 | 2 | 0 | 0 | 0 | 0 |
| 0 | 0 | 0 | 2 | 2 | 2 | 2 | 0 | 0 | 0 | 0 |
| 0 | 0 | 0 | 0 | 0 | 0 | 0 | 0 | 0 | 0 | 0 |

DIGITAL WATERMARK IMAGE PROCESSING METHOD

CROSS-REFERENCE TO RELATED APPLICATION

The present application relates to subject matter described in application Ser. No. 09/144,989 filed Sep. 1, 1998 entitled "Method and Apparatus for Embedding Information Into Contents", the description of which is incorporated by reference.

BACKGROUND OF THE INVENTION

The invention relates to a digital watermark method of embedding various information such as copyright, sales date, sales destination, and the like into image data.

The following items are required in a digital watermark function to change a data value of image data and embed information such as a copyright and the like in accordance with a changing method.

(1) The human being cannot perceive a change in image data or can judge that such a change lies within a extent which does not become a problem on use.

(2) Even if a process accompanied with a change in image data value such as a JPEG (Joint Photographic Experts Group) compression or the like is performed to image data in which information has been embedded, the embedded information is hardly extinguished and can be perceived.

In the conventional information embedding technique, as disclosed in "Nikkei Electronics", Vol. 683, pages 99–107, 1997, to satisfy those requirements, a device has been made with respect to the kind of value as a target to be changed. That is, a change is added to the value so that the change is inconspicuous and the embedded information is hard to be extinguished. For example, an image is frequency-expressed and a change is added to coefficients of middle-range values.

The relation between the change in image value and the visual change differs every image and, further, in dependence on a region in the image. For example, in a flat region, even a slight value change is conspicuous, while in a complicated region such as a forest photograph, even a large value change is inconspicuous.

In the above conventional technique, however, a magnitude of the value change cannot be optimized in dependence on the nature of the image. In case of preferentially aiming the prevention of the visual change, therefore, it is necessary to reduce the value change by presuming a case of a flat image and the survivability against an image process is small. In case of preferentially aiming the survivability to the image process, it is necessary to increase the value change and a visual change occurs in a flat image. That is, according to the conventional method, it is difficult to realize both of the prevention of the visual change and the survivability against the image process.

As the related application to this invention, there are JP-A-8-161483, JP-A-10-49669, JP-A-10-49670, U.S. Ser. No. 08/258,382 and JP-A-10-283471.

SUMMARY OF THE INVENTION

To solve the above problems, it is an object of the invention to provide a method which can realize both of the prevention of the visual change and the survivability against the image process in a process to embed information into image data.

In the field of a medical image process, a filter to make a diagnosis by the doctor easy for a photograph of the human body photographed by using an X-ray or an MRI is being studied. The most advanced medical filter has the following nature as disclosed in The Transactions of The Institute of Electronics, Information and Communication Engineers, D-II, Vol. J79-D-II, No. 8, pages 1347–1353.

(1) Noises are removed by a smoothing process.

(2) With respect to edge information that is important for the human sight, namely, a portion where an outline of an object or a nature of a plane changes, a shape is preserved.

The present inventors hit an idea to solve the above problems by using the nature of the medical filter mentioned above. That is, the above problems can be solved by an information processing system comprising means for inputting image data and means for embedding information into the image data, wherein a data value of the image data which is imperceptible by the human being or which does not obstruct the reference to the image by the human being is changed by using the medical filter, a range between the value before the change and the value after the change is set to a changeable range of the value in the information embedding, and the information is embedded by changing the data value of the image data within the changeable range.

BRIEF DESCRIPTION OF THE DRAWINGS

FIG. 9 is a diagram showing an example of an information adding position image map formed;

FIG. 10 is a diagram showing another example of an information adding position image map formed;

FIG. 11 is a diagram showing further another example of an information adding position image map formed;

FIG. 12 is a diagram showing a flow of an image which is formed in each process according to another embodiment;

DESCRIPTION OF THE PREFERRED EMBODIMENTS

An embodiment of the invention is mainly divided into two portions of a portion to insert information into image data and a portion where the information is extracted from an image in which the information has been inserted. It is a feature of the portion where information is inserted into image data according to the invention that a data change permission amount in which a data value of image data can be changed by using an image filter is obtained every image position, the data value is changed on the basis of the data change permission amount, and information is inserted into the image data.

In Chapter (1), an outline of a whole construction of the invention will be simply explained hereinbelow. In Chapter (2), one embodiment will be described in detail with respect to the portion where information is inserted into the image data according to the invention. In Chapter (3), another embodiment will be explained in detail with regard to a portion where the information is extracted from the image in which the information has been inserted.

(1) Outline of a Whole Construction

The whole construction of the invention will be simply explained hereinbelow with reference to FIGS. 1 and 2. In the constructional example, it is assumed that a still image is used as a target and information is embedded therein by changing intensities of pixels.

Figure 1:
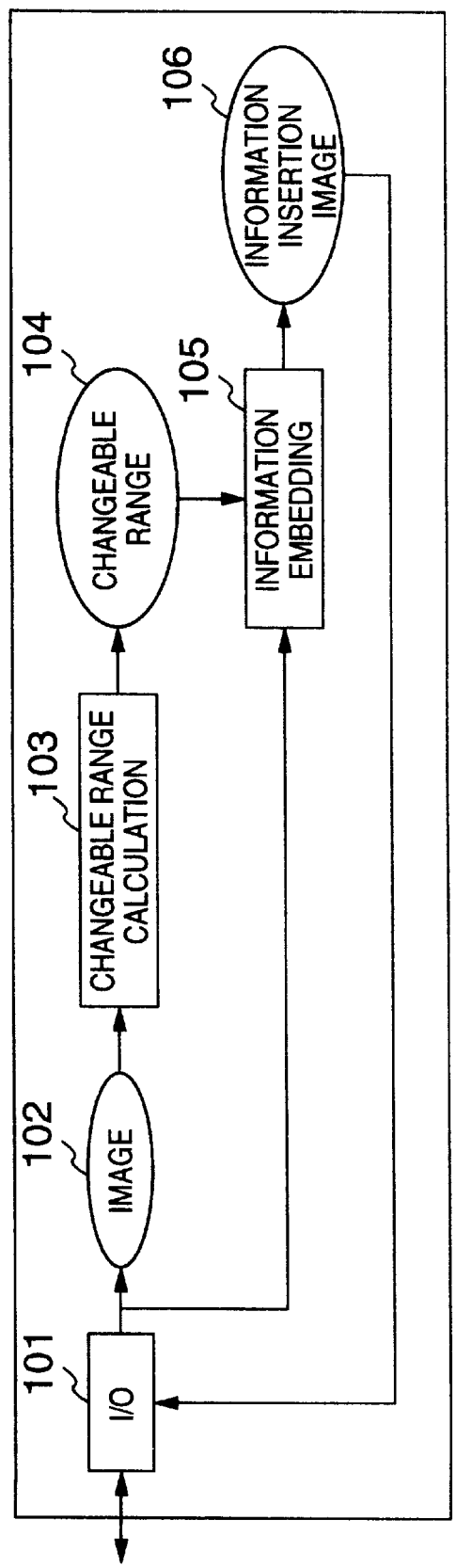
FIG. 1 is a function constructional diagram showing a concept of a whole construction of the invention.
Figure 2:
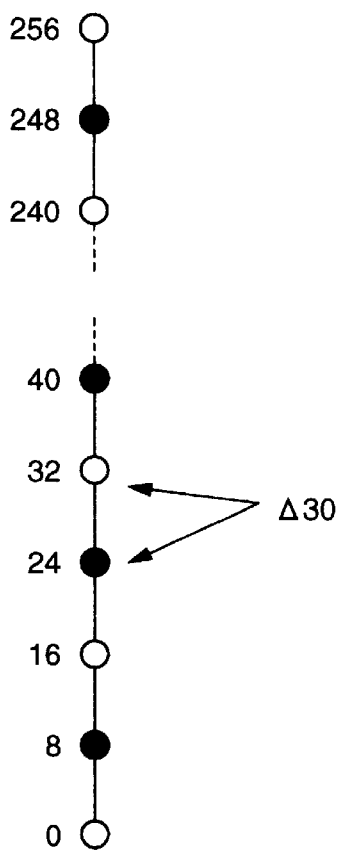
FIG. 2 is a diagram showing a changing method of intensity values of pixels in the function constructional diagram of FIG. 1.

FIG. 1 is a function constructional diagram of the invention. Elements shown by rectangles, namely, an input/output 101, a changeable range calculation 103, and an information embedding 105 indicate processes and are realized by a CPU of a computer. Elements shown by ellipses, namely, an image 102, a changeable range 104, and an information insertion image 106 denote data and are realized by a storing apparatus of the computer.

The inputting/outputting process 101 inputs an image and stores it into a storing apparatus. In the changeable range calculating process 103, first, the foregoing medical filter or an image process similar thereto is applied to the image 102. Thus, an image in which an intensity is different from that of the image 102 and which is visually similar to it is obtained. In the changeable range calculating process 103, subsequently, the intensity before the image process is applied and the intensity after it was applied are stored every pixel. This is the changeable range data 104.

In the information embedding process 105, pixels whose intensities are changed are selected from among pixels of the image data 102. Subsequently, with respect to each of the selected pixels, by changing the intensity to a specific value, the information is embedded. Thus, the information insertion image 106 is obtained. The information insertion image 106 is outputted to the outside through the inputting/outputting process 101.

A changing method of the intensity in the information embedding process 105 will now be described with reference to FIG. 2. It is now assumed that a value of the intensity of one pixel lies within a range of 0 to 255. FIG. 2 shows the intensity values of the pixel by a number line. In the embodiment, a white circle on the number line, namely, a point in which the value is a multiple of "16" corresponds to the embedding information "0". A black point, namely, a point in which the value is equal to (multiple of "16"+8) corresponds to embedding information "1".

The basic operation of the information embedding process 105 will be first described and, after that, the use of the changeable range data 104 will be explained. First, the basic operation will be described. The intensity of the pixel of the image data 102 is changed to the nearest white or black circle. That is, when the information to be embedded into the pixel is equal to "0", the intensity is changed to the white circle. When it is equal to "1", the intensity is changed to the black circle. For example, in the case where the intensity of the pixel is equal to Δ, namely, 30 in the diagram and the information to be embedded is equal to "0", the intensity of the pixel is changed to 32. When the information to be embedded is equal to "1", the intensity is changed to 24.

The use of the changeable range data 104 will now be described. In the above fundamental operation, there is a case where since the change in intensity of the pixel is too large, the image is visually changed. To prevent such a situation, the value of the pixel is changed within the range of the changeable range data 104. For example, it is now assumed that the intensity of the pixel is equal to Δ, namely, 30 and the changeable range of the intensity of the pixel lies within a range of 26 to 33. In this case, when the information to be embedded is equal to "0", the intensity of the pixel is changed to 32 in accordance with the above fundamental operation. However, when the information to be embedded is equal to "1", since the intensity 24 of the change destination side is not included in the changeable range, the intensity is changed to 26 as a value that is the nearest to 24.

Finally, the extraction of information from the watermark inserted image data 106 will now be described. A pixel whose value should be referred (for example, a portion in which information in FIG. 9 has been embedded) is first selected. In the selection of the pixel, the same rule as the pixel selecting rule in the information embedding process 105 is used. Therefore, the pixels whose intensities were changed are selected.

Subsequently, with respect to each of the selected pixels, the intensity is extracted and whether the embedded information is equal to "0" or "1" is discriminated by checking to which one of the multiple of "16" and (the multiple of "16"+8) the intensity value is closer.

As mentioned above, in the information embedding process 105, since the intensity is changed in the changeable range 104, there is a case where the intensity cannot be accurately changed to the multiple of "16" or (the multiple of "16"+8). Therefore, an error occurs at a predetermined probability in the extraction of the information. This problem can be solved by overlappingly embedding the same information into a plurality of pixels and performing a majority decision in the extraction.

According to the embodiment as mentioned above, the information is embedded into the image and the embedded information can be extracted. In the information embedding, the value of the image can be changed only in a range where it is guaranteed that there is no visual deterioration of the image, namely, only in the changeable range. Since the changeable range is calculated every pixel, by changing the value as much as possible every pixel, the survivability to the image process can be enhanced.

Although the above embodiment has been described on the assumption that the data value of the image data is changed, in case of sound data, similarly, one-dimensional data in which a sound was obtained is filtered, a difference between the original sound data and the sound data derived after the filtering is set to changeable data, and information of "0" or "1" can be also provided in dependence on whether the sound data of predetermined time is changed by only such a difference amount or not. It is also possible to construct in a manner such that the sound data is converted to two-dimensional data based on a axis of frequency and an axis of time and is handled similarly to an image, the above image process is performed, and information is provided. Those methods as mentioned above can be regarded as a method of inserting information into contents such as image data, sound data, or the like.

(2) Embodiment (Detailed Embodiment in which Information Is Added to Image Data)

An embodiment of the invention will now be described hereinbelow separately with respect to four paragraphs. A whole flow is shown in Paragraph (2-1). Partial processes will be explained in detail in Paragraph (2-2). An embodiment in which a function is further added with respect to a partial process among them will be explained in Paragraph (2-3). Various methods of selecting the image position where information is added will be described in Paragraph (2-4).

(2-1) Whole Explanation of the Embodiment

Figure 3:
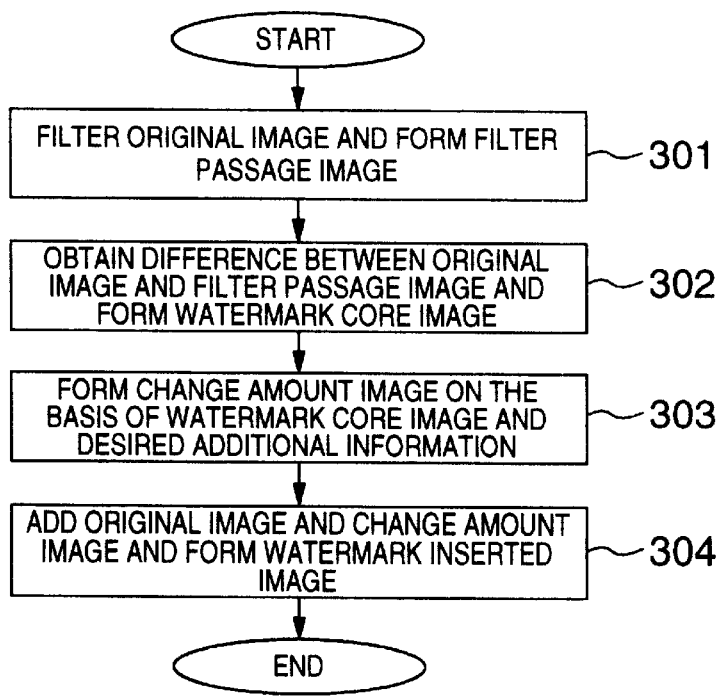
FIG. 3 is a flowchart of an embodiment of the invention.
Figure 4:
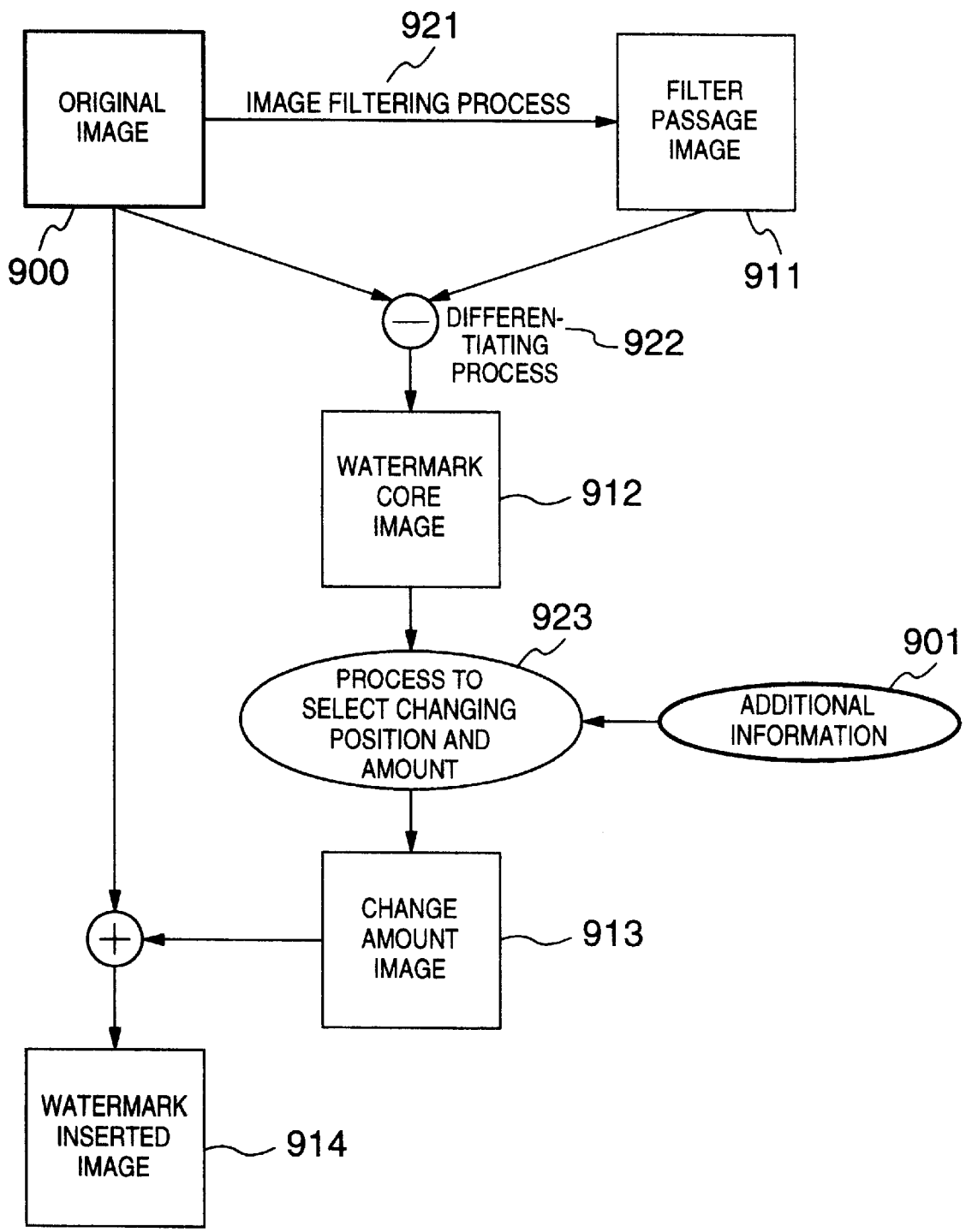
FIG. 4 is a diagram showing a flow of an image which is formed in each process in the embodiment of FIG. 3.

A whole construction of an embodiment of the invention will be described with reference to FIGS. 3 and 4. FIG. 3 is a flowchart. FIG. 4 is a diagram showing a flow of an image which is formed in each process. Reference numerals in the flowchart of FIG. 3 denote processing step numbers and a procedure will now be described hereinbelow.

Step 301

An image filtering process 921 is performed to an original image 900, thereby forming a filter passage image 911. The following one-dimensional smoothing type filter in the minimum change direction disclosed in the item of the foregoing means can be used as an image filtering process 921.

(A) Kunihiko KIDO, et al., "improvements of MRI Image Quality Using Directional Adaptive Filter", Singakuron (D-II), Vol. J79-D-II, No. 8, pages 1347–1353, 1996.

Other various image filters can be also used. For example, the image filters cited in the above and following papers or the like and the other various edge preservation type image filters or the like can be used.

(B) Jun'ichi TAGUCHI, "Directional Adaptive Image Filter Respectively Adjusted to Edge and Flat Regions", Singakuron (D-II), Vol. J80-D-II, No. 9, pages 2345–2350, 1997.

Step 302

A difference between the original image 900 and filter passage image 911 is obtained, thereby forming a watermark core image 912.

Now, assuming that the data value of the original image 900 is labeled as O[x,y] and the data value of the filter passage image 911 is labeled as F[x,y] and the data value of the watermark core image 912 is labeled as S[x,y], there is the relation shown by the following equation (1).

$$S[x,y]=F[x,y]-O[x,y] \tag{1}$$

where, [x,y] denotes x rows and y columns of the image.

Step 303

A change amount image 913 is formed by performing a process 923 to select a changing position and a change amount at which the data value of the original image 900 is changed on the basis of the watermark core image 912 and desired additional information 901.

Various processing methods of the process 923 to select the changing position and the change amount are considered and will be explained in detail hereinlater in Paragraphs (2-2) to (2-4).

Step 304

The data of the original image 900 and the data of the change amount image 913 are added, thereby forming a watermark inserted image 914.

Now, assuming that the data value of the watermark inserted image is labeled as W[x,y], the relation shown by the following equation (2) is satisfied.

$$W[x,y]=O[x,y]+S[x,y] \tag{2}$$

(2-2) The Details of Step 303

Figure 5:
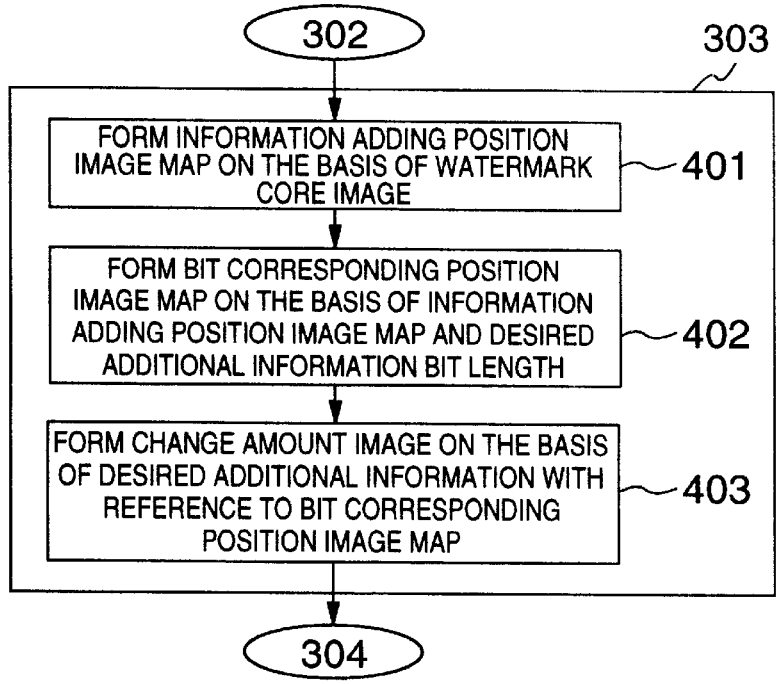
FIG. 5 is a detailed flowchart of step 303 in the embodiment shown in FIG. 3.
Figure 6:
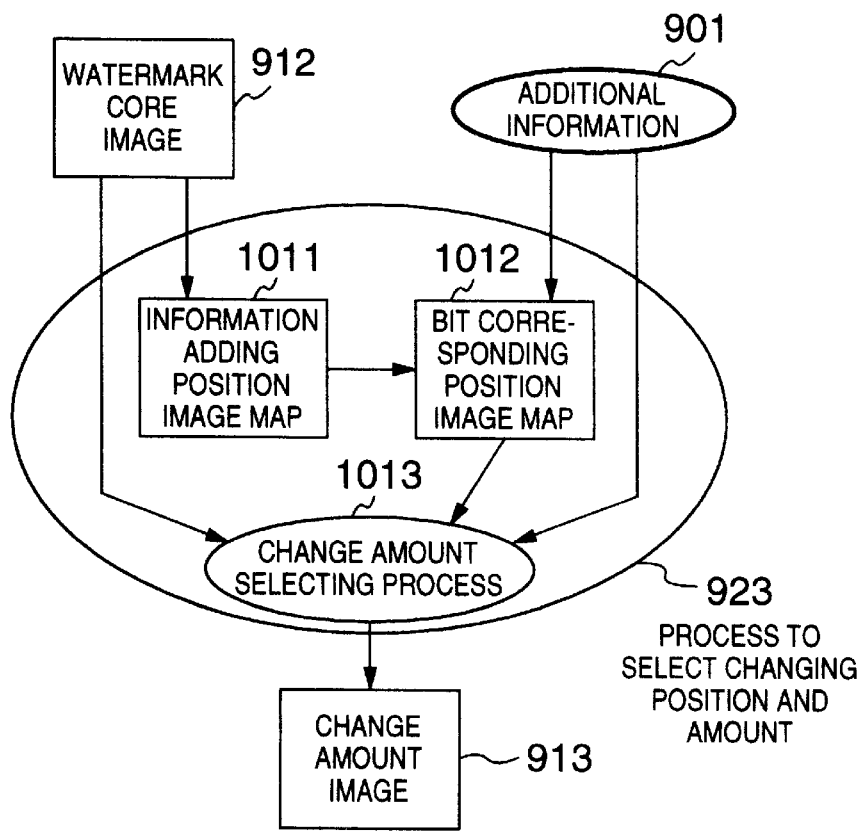
FIG. 6 is a diagram showing a flow of an image which is formed in step 303 in the embodiment of FIG. 3.

An internal process in step 303 will be described in detail with reference to FIGS. 5 and 6. FIG. 5 is a flowchart and FIG. 6 is a diagram showing a flow of an image that is formed in each process. Reference numerals in the flowchart of FIG. 5 denote processing step numbers and a procedure will be explained hereinbelow.

Step 401

An information adding position image map 1011 is formed on the basis of the watermark core image 912. Various methods of forming the information adding position image map are considered and will be described in detail in Paragraph (2-4). For example, it is assumed that a data value P[x,y] of the information adding position image map 1011 is obtained as shown by the following equations (3) and (4).

$$\text{In case of } |S[x,y]| \geq L0: P[x,y]=1 \tag{3}$$

$$\text{In case of } |S[x,y]| < L0: P[x,y]=0 \tag{4}$$

That is, in the equation (3), when the absolute value of the data value of the watermark core image 912 is larger than a predetermined value L0, it is determined that information is inserted to the position. The data P[x,y] of the information adding position image map 1011 is set to a value "1" indicative of the insertion of the information. In the equation (4), when the absolute value of the data value of the watermark core image 912 is smaller than the predetermined value L0, it is determined that information is not inserted to the position. The data P[x,y] of the information adding position image map 1011 is set to a value "0" indicative of the non-insertion of the information.

That is, the information adding position image map 1011 is a map showing at which position in the original image 900 the information is added.

Step 402

The additional information 901 is shown by a bit train of "0" and "1". For example, in case of a character train of alphanumeric characters, one character can be expressed by one byte (eight bits). Therefore, in case of adding alphanumerical character information of total 16 characters, they can be expressed by a bit train of (8*16=128 bits). In this instance, in case of giving information of one bit to the image position where the value of the information adding position image map 1011 has the value of "1" showing the addition of the information, a process to form a bit corresponding position image map 1012 for deciding at which image position the information of which bit of the additional information 901 is given is executed.

There are various methods of forming the bit corresponding position image map 1012.

For example, in case of describing by a program language, the Y axis direction of coefficients is set to an external loop, the X axis direction is set to an internal loop, they are ordered, and the value of the information adding position image map 1011 is retrieved. The number of hits when the value of the information adding position image map 1011 is hit to the value of "1" showing the addition of the information is counted from the beginning of the loop (the counting starts from "0"). A remainder obtained when the count value is divided by 128 as a bit length is set to a value of the bit corresponding position image map 1012 at the image position. When the value of the information adding position image map 1011 is equal to "0" showing that no information is added, the value of the bit corresponding position image map 1012 is set to a predetermined value (for example, "−1") showing that no information is added.

Consequently, the bit corresponding position image map 1012 becomes a map showing at which image position the information of which number of bit from the first bit in the additional information 901 (the bit order is counted from "0") is inserted.

Step 403

The bit value information of "0" or "1" is extracted from the bit train of the desired additional information 901 with reference to the bit corresponding position image map 1012 every position of the image, a change amount selecting process 1013 is performed with reference to the value of the watermark core image 912 in accordance with the bit value, and the change amount image 913 is formed.

Various processes are considered as a change amount selecting process 1013. For example, if the corresponding bit value is equal to "0", the change amount is set to "0" and, when the bit value is equal to "1", the data value of the watermark core image 912 can be set to the change amount. That is, the data value C[x,y] of the change amount image 913 is set to the value shown in the following equation (5), (6), or (7). The map value of the bit corresponding position image map is set to M[x,y] and the value of the k-th bit of the bit train of the additional information 901 is set to b[k]. The data value of the watermark core image 912 is set to S[x,y].

When M[x,y] is equal to a predetermined value (for example, "−1") showing that no information is inserted:

$$C[x,y]=0 \quad (5)$$

When M[x,y] is not equal to a predetermined value (for example, "−1") showing that no information is inserted and b[M[x,y]]=0:

$$C[x,y]=0 \quad (6)$$

When M[x,y] is not equal to a predetermined value (for example, "−1") showing that no information is inserted and b[M[x,y]]=1:

$$C[x,y]=S[x,y] \quad (7)$$

The above cases are shown as an example and other various cases are considered. For example, the following equations (8) and (9) can be also used in place of the equations (6) and (7).

When M[x,y] is not equal to a predetermined value (for example, "−1") showing that no information is inserted and b[M[x,y]]=0:

If $S[x,y]<-4$, $C[x,y]=S[x,y]$

If $S[x,y]>-4$, $C[x,y]=-4$ \quad (8)

When M[x,y] is not equal to a predetermined value (for example, "−1") showing that no information is inserted and b[M[x,y]]=1:

If $S[x,y]>4$, $C[x,y]=S[x,y]$

If $S[x,y]<4$, $C[x,y]=4$ \quad (9)

In case of using the method of the above equations (8) and (9), if the bit value b[M[x,y]] in which information is inserted is positive, it is guaranteed that the value C[x,y] of the change amount is positive. If the bit value b[M[x,y]] is negative, it is guaranteed that the value C[x,y] of the change amount is negative. Therefore, when the information adding position image map 1011 is formed, if the pixels are gathered at the adjacent positions and are made correspond to a specific bit, for example, four pixels of 2*2 are made correspond as one group to the information of a specific bit, when the bit value b[M[x,y]] corresponding to the group of 2*2 is positive, the whole group of 2*2 is subjected to a change of a positive value. When the bit value b[M[x,y]] is negative, the whole group of 2*2 is subjected to a change of a negative value. Therefore, an average is obtained from the whole group of 2*2 and a discrimination can be performed. If the data value of the watermark inserted image 914 is altered, by discriminating as an average of the whole group of 2*2, an effect such that a read error of the additional information 901 decreases can be obtained.

(2-3) Example of a Function Expansion of Step 403

Figure 7:
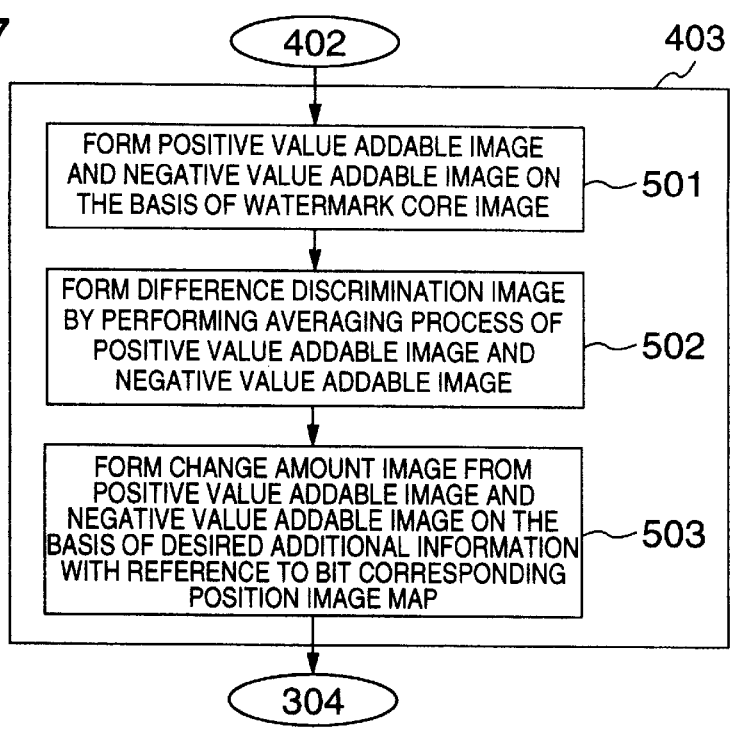
FIG. 7 is a function expansion flowchart of step 403 in the embodiment of FIG. 3.
Figure 8:
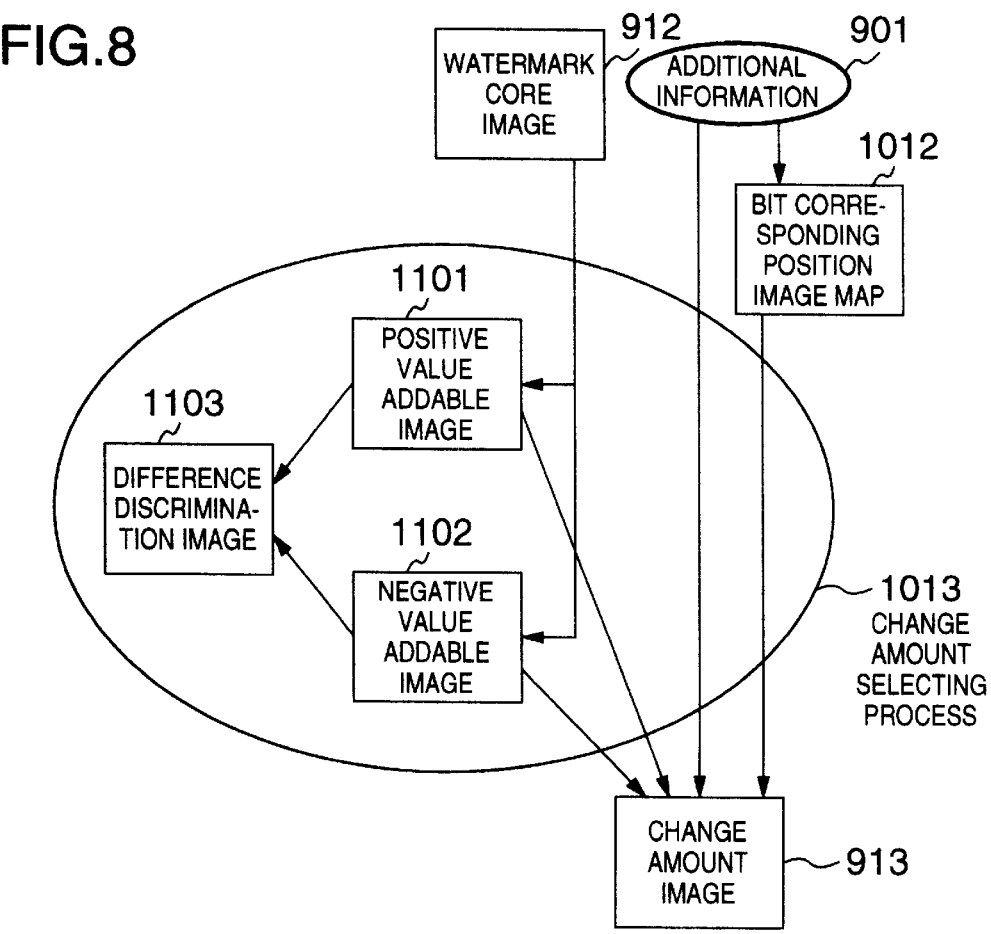
FIG. 8 is a diagram showing a flow of an image which is formed by the expanding function in step 403 in the embodiment of FIG. 3.

The function to expand the internal process in step 403 will now be described with reference to FIGS. 7 and 8. FIG. 7 is a flowchart and FIG. 8 is a diagram showing a flow of an image which is formed in each process. Reference numerals in the flowchart of FIG. 7 denote processing steps and a procedure will be described hereinbelow.

Step 501

A positive value addable image 1101 and a negative value addable image 1102 are formed on the basis of the watermark core image 912. The positive value addable image 1101 shows a changeable range value of the positive data value. The negative value addable image 1102 shows a changeable range value of the negative data value. The change amount image 913 can be formed by selecting from the values of the positive value addable image 1101 and negative value addable image 1102 in accordance with the bit value of the additional information 901.

For example, in case of inserting information as shown in the equations (8) and (9), the change amount image 913 is formed as shown in the following equations (10) and (11). However, the positive value addable image 1101 is labeled as POS[x,y] and the negative value addable image 1102 is labeled as NEG[x,y]. The data value of the watermark core image 912 is set to S[x,y].

If $S[x,y]>4$, $POS[x,y]=S[x,y]$

If $S[x,y]<4$, $POS[x,y]=4$ \quad (10)

If $S[x,y]<-4$, $NEG[x,y]=S[x,y]$

If $S[x,y]>-4$, $NEG[x,y]=4$ \quad (11)

Step 502

An average image of the positive value addable image 1101 and negative value addable image 1102 is formed and is used as a difference discrimination image 1103. The difference discrimination image can be used later as an image for comparison discrimination when the information is extracted from the watermark inserted image 914, an image obtained by modifying it, and the like. A method of extracting the information will be explained in detail hereinlater in Chapter (3).

Step 503

The change amount image 913 is formed from the positive value addable image 1101 and negative value addable image 1102 on the basis of the desired additional information 901 with reference to the bit corresponding position image map 1012.

For example, now defining as shown in the equations (10) and (11) in step 501, by using the following equations (12) and (13), the same processing values as those in the equations (8) and (9) are obtained. However, the symbols are the same as those in the equations (8) to (11).

When M[x,y] is not equal to a predetermined value (for example, "−1") showing that no information is inserted and b[M[x,y]]=0:

$$C[x,y]=NEG[x,y] \quad (12)$$

When M[x,y] is not equal to a predetermined value (for example, "−1") showing that no information is inserted and b[M[x,y]]=1:

$$C[x,y]=POS[x,y] \quad (13)$$

(2-4) Method of Selecting the Image Position where Information Is Added

Various methods of selecting the image position where information is added will now be described herein below. Although the image position where information is added is substituted as a value into the information adding position image map 1011, in the above description in step 401, the selecting method as shown in the equations (3) and (4) has been mentioned as an example. The other selecting methods will now be described with reference to FIGS. 9, 10, 11, and 12.

FIGS. 9 to 12 are diagrams showing specific examples of the information adding position image map 1011. In Paragraph (2-2), when the absolute value of the data value of the watermark core image 912 is larger than the predetermined threshold value L0, the value is set to "1" showing the addition of the information. When it is smaller than L0, the value is set to "0" showing that no information is added.

FIGS. 6 and 7 show an example in which pixels are arranged in a manner such that the value of "2" is substituted with respect to predetermined peripheral pixels, for instance, eight peripheral points of a target pixel in which the information of the information adding position image map 1011 has been added, namely, the value of "1" has been inserted and the portion where the value of "2" is inserted is set to the portion where the information is added and this portion is not selected.

The above example is characterized in that the information adding position image map 1011 is formed so that the above relations are satisfied even if attention is paid to the pixel to which arbitrary information has been added. In FIGS. 11 and 12, although the information has been inserted every block of 2*2, it is similarly guaranteed that no information is not inserted to predetermined points near the point where the information has been inserted except for the correlation in the block. Each case will now be described hereinbelow.

FIG. 9 shows an example in which the positions where the information is added are intermittently selected at intervals. For example, "0" is substituted into all of the points as an initial value of the information adding position image map 1011. The values in the information adding position image map 1011 are sequentially set to the value "1" showing the addition of the information in accordance with the order from the large absolute value of the watermark core image 912. In this instance, it is confirmed that the peripheral points are not equal to the value "1" showing the addition of the information. If there is any point of the value "1" among the peripheral points, by setting the value to "0" showing that no information is added, the information adding position image map 1011 as shown in FIG. 9 can be formed.

FIG. 10 shows an example of the information adding position image map 1011 in the case where it has the same information adding positions as those in FIG. 9 and the peripheral points around the point where the information is added are set to a value "2" indicative of the existence of information around the information adding point. For example, "0" is first substituted as an initial value into all of the points and the value "1" indicative of the addition of the information is similarly sequentially substituted in accordance with the order from the large absolute value of the watermark core image 912. In this instance, the value is set to "2" showing the existence of the information in the peripheral points. However, if the value of this point is not equal to the initial value "0" before the substitution, the substitution of the value of this point and the substitution of the values of the peripheral points are not performed. In this manner, the information adding position image map 1011 of FIG. 10 can be formed.

The forming procedure of the information adding position image map 1011 of FIG. 10 mentioned above can be rewritten as follows. The data in the information adding position image map 1011 is subsequently subjected to the change discrimination in accordance with the order of selecting the position of the image to which the information should be added with reference to the data value of the watermark core image 912. When the value of the data in the information adding position image map 1011 at the image position to be subjected to the discrimination is equal to the initial state value (namely, the value of "0" in the diagram), it is determined that the information can be added. The data values in the information adding position image map 1011 are changed to the data value (namely, the value of "1" in the diagram) showing the addition of the information. Further, the data values in the information adding position image map 1011 in the predetermined peripheral pixel range are changed to the data value (namely, the value of "1" in the diagram) indicative of the existence of the data near the information adding point on the basis of the discrimination position as a reference. If the data value in the information adding position image map 1011 at the image position to be discriminated is not equal to the initial state value (namely, the value of "0" in the diagram), it is decided that the information cannot be added. The data value in the information adding position image map 1011 is not changed.

FIG. 11 shows the example in case of substituting the value in an interlocking relational manner in the 2*2 block. For example, the initial value "0" is first substituted into all of the points. The value is set to "1" showing that the information is inserted into the whole 2*2 block in accordance with the order from the largest sum of the absolute values of the 2*2 block of the watermark core image 912. At this time, if any one of the 2*2 block or any one of the values of the peripheral points has the value of "1", by setting the 2*2 block to the value of "0" showing that no information is added, the information adding position image map 1011 of FIG. 11 is obtained.

FIG. 12 shows an example of the information adding position image map 1011 in which the positions where the information should be inserted are similar to those in FIG. 11. However, the peripheral points at the positions where the information should be inserted are set to the value of "2" showing that the points where the information should be inserted exist around the relevant point in a manner similar to FIG. 10. Similarly, for example, "0" is first substituted as an initial value into all of the points. Similarly, the value "1" showing the addition of the information is sequentially substituted into the whole 2*2 block in accordance with the order from the large sum of the absolute values of the 2*2 block of the watermark core image 912. In this instance, the peripheral points of the 2*2 block are set to the value of "2" showing that there is the information in the peripheral points. If the value of any one of the points in the 2*2 block is not equal to the initial value "0" before substituting, the substitution of the value of the point in the block and the substitution of the values of the peripheral points of the block are not performed. As mentioned above, the information adding position image map 1011 in FIG. 12 can be formed.

In case of collectively inserting the same information like a 2*2 block or the like as shown in FIG. 11 or 12 as mentioned above, there is an advantage such that it is stronger against the alteration of data than the single case. Even in case of reading out the information, it can be read out by a majority decision logic or the discrimination can be also performed on the basis of the value obtained by adding all of the values in the block in which the information was inserted.

Although the explanation has been made above with respect to the case where the information as a minimum unit to be inserted as a watermark has the value of "0" or "1", other various values are considered. For instance, it is also possible to construct as follows. The information which is actually added to an image is set to three states of "0", "1", and "2". In the state of "2" added newly, superimposing performance is provided for information as information such that desired information to be added is not inserted in the original image 900. Information which is actually added to the image is formed from the desired information to be added. The data value of the original image 900 is changed on the basis of the information that is actually added to the image and the watermark inserted image 914 can be also formed.

(3) Method of Extracting Information

The watermark inserted image 914 is formed as shown in Chapter (1) or (2) mentioned above. The watermark inserted image 914 and the image obtained by altering the watermark inserted image 914 are generally called a watermark detecting image (image whose watermark is detected) 1200. In this Chapter, a method of detecting the information inserted as a watermark from the watermark detecting image 1200 will be described hereinbelow as a third embodiment of the invention.

Figure 13:
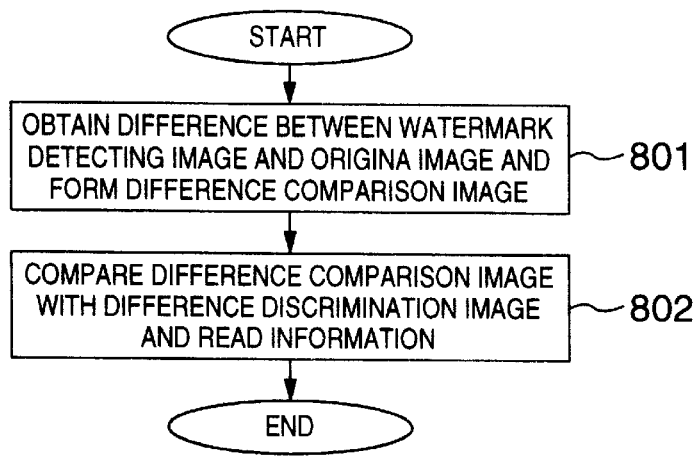
FIG. 13 is a flowchart in another embodiment.
Figure 14:
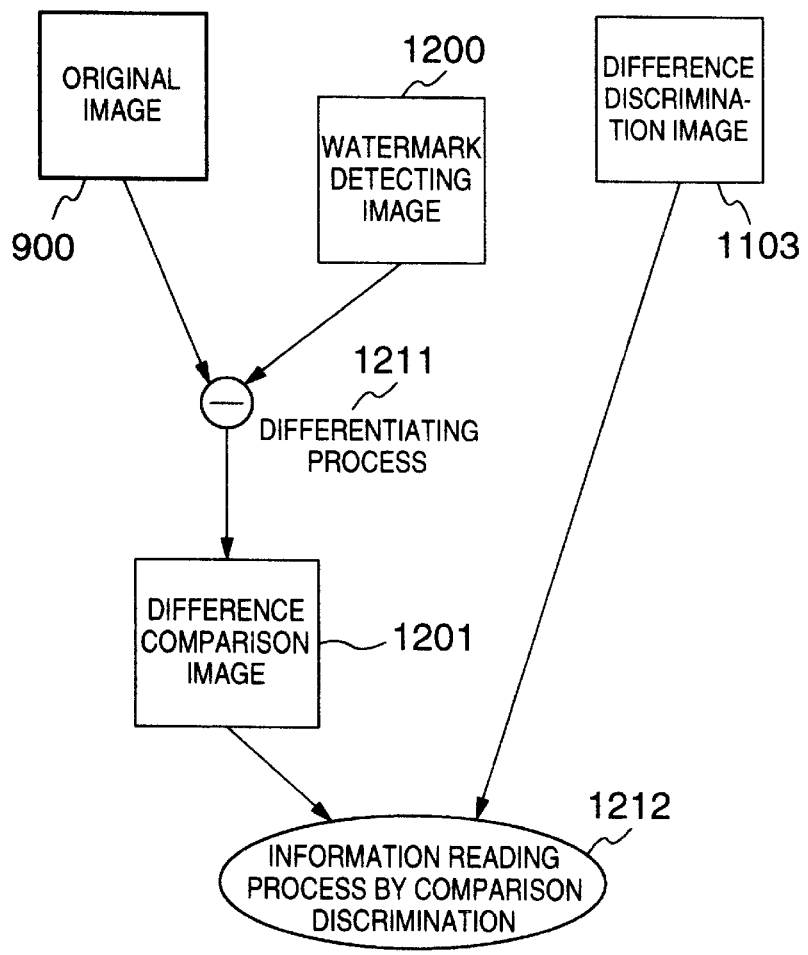
FIG. 14 is a diagram showing another example of an information adding position image map formed.

FIG. 13 is a flowchart showing a procedure of an example of detecting information. FIG. 14 is a diagram showing a flow of image data which is used or formed in each procedure. Reference numerals in the flowchart of FIG. 13 denote processing step numbers and a procedure will now be described hereinbelow.

Step 801

A difference comparison image 1201 is formed by performing a differentiating process 1211 to obtain a difference between the watermark detecting image 1200 and original image 900. This process can be expressed by the following equation (14).

$$R[x,y]=G[x,y]-O[x,y] \qquad (14)$$

where, the watermark detecting image 1200 is labeled as G[x,y], the original image 900 is labeled as O[x,y], and the difference comparison image 1201 is labeled as R[x,y], respectively.

Step 802

By comparing the data value of the difference comparison image 1201 with that of the difference discrimination image 1103, the information added to the watermark detecting image 1200 is read out. The reading of the information depends on the method of inserting the information. Explanation will now be made on the assumption that the information is inserted as shown by the equations (8) and (9).

In this instance, the simplest reading method is a method whereby when the data value of the difference comparison image 1201 is larger than the data value of the difference discrimination image 1103, it is decided that "1" has been inserted as a bit value and, when the data value of the difference comparison image 1201 is smaller than the data value of the difference discrimination image 1103, it is determined that "0" has been inserted as a bit value. At this time, it is convenient to refer to the bit corresponding position image map 1012 to calculate at which bit position in the additional information 901 the bit value at a predetermined position exists. If the bit corresponding position image map 1012 has already been lost, the process when inserting the information is again performed and the bit corresponding position image map 1012 can be formed.

According to the above processes, various improving methods of improving the precision for the reconstruction of the information exist. For example, when a fact that the watermark detecting image 1200 has been subjected to a specific process such as a JPEG compression or the like is clear, an original modified image obtained by performing the same process as the process performed to the watermark detecting image 1200 with respect to the original image is formed in place of the original image 900. The information can be read out by comparing the watermark detecting image 1200 and the original modified image. For example, in step 801, the difference comparison image 1201 can be formed by performing the differentiating process 1211 between the original modified image and the watermark detecting image 1200 in place of the original image 900. By this method, since the original image 900 is subjected to the same process as that of the watermark detecting image 1200, a degree of image deterioration due to the processing method is similar to that mentioned above. In the difference image, the influence by the process performed to the watermark detecting image is cancelled and the information can be detected at high precision.

Although the above description relates to the case where the process performed to the watermark detecting image 1200 has been well-known, the process performed to the watermark detecting image 1200 cannot be usually known. In this case, the deterioration of the information is presumed and the information can be extracted at high precision by the following method.

For example, as a method of selecting the information embedding position, as for the information adding position image map 1011, the information can be discriminated as follows in the case where information is inserted so as to have a predetermined distance between the adjacent information except for the case where the points in which the information has been inserted are synchronized and the information is inserted as a block as shown in FIGS. 9 to 12. First, in a manner similar to step 801, the difference comparison image 1201 is formed by performing the differentiating process 1211 between the watermark detecting image 1200 and original image 900. Subsequently, in step 802, with respect to the peripheral positions of the image position where the desired information to be added has been embedded, the data value in the case where the information of the difference comparison image 1201 at the image position where the information to be added was embedded is not added is presumed with reference to the data value of the difference comparison image 1201. The information added to the watermark detecting image 1200 is read out.

For example, as for the pixel value of the pixel at the corresponding position having the value of "1" which is the position where the information is added in FIG. 10, the average value of the pixel values of the image corresponding to the peripheral positions having the value of "2" in FIG. 10 is set to the predictive value.

Various processes are considered as a foregoing process to presume the data value in the case where the information of the difference comparison image data is not added. For example, the average value of the data values of the difference comparison image 1201 with respect to the peripheral positions of the image position where the desired information to be added was embedded is obtained and can be used as a predictive data value in the case where no information is added. As another method, edge image data is formed by performing a process to detect the edges of the original image 900 and a predictive data value when no information is added can be also obtained on the basis of a correlation between the difference comparison image 1201 and the edge image data.

As shown in FIGS. 11 and 12, when desired information to be added is embedded, in case of forming the watermark inserted image 914 by overlappingly embedding the same information to a plurality of image positions like a 2*2 block or the like, when the information embedded in the watermark detecting image 1200 is detected, a majority decision is performed with respect to each of the information detection results at the image positions where the information was overlappingly embedded and a decision result can be also used as a final information detection result. Or, the data values at the image positions where the information was overlappingly embedded are added and the information can be also detected on the basis of an addition result.

According to the embodiments of the invention, in the information embedding into the image data, the data value of the image data can be largely changed as much as possible within the range where the image quality does not deteriorate, so that both of the prevention of the deterioration and the survivability of the embedded information can be realized.

What is claimed is:

1. A digital watermark image processing method in an image processing apparatus having means for adding information by changing a data value of image data and means for detecting the information added to said image data, comprising the steps of:

forming filter passage image data by performing an image filtering process to original image data;

forming watermark core image data by performing a process to obtain a difference between said filter passage image data and said original image data;

forming change amount image data by performing a process to obtain a value to change a data value of said original image data on the basis of said watermark core image data and desired information to be added; and forming watermark inserted image data by performing a process to add said original image data and said change amount image data.

2. A method according to claim 1, wherein when said change amount image data is formed by performing the process to obtain the value to change the data value of said original image data on the basis of said watermark core image data and said desired information to be added, information adding position image map data is formed by performing a process to select an image position where the information should be added on the basis of the data value of said watermark core image data.

3. A digital watermark image processing method in an image processing apparatus having means for adding information by changing a data value of image data and means for detecting the information added to said image data, comprising the steps of:

forming filter passage image data by performing an image filtering process to original image data;

forming watermark core image data by performing a process to obtain a difference between said filter passage image data and said original image data;

forming change amount image data by performing a process to obtain a value to change a data value of said original image data on the basis of said watermark core image data and desired information to be added; and forming watermark inserted image data by performing a process to add said original image data and said change amount image data, wherein when said change amount image data is formed by performing the process to obtain the value to change the data value of said original image data based on said watermark core image data and said desired information to be added, information adding position image map data is formed by performing a process to select an image position where the information should be added based on the data value of said watermark core image data, wherein when the information adding position image map data is formed by performing the process to select the image position where the information should be added based on the data value of said watermark core image data, and wherein if a data value of a target pixel of the information adding position image map data denotes that the information has been added, the case of adding the information in an interlocking relation therewith is excluded and, with respect to predetermined peripheral pixels of said target pixel, said information adding position image map data is formed so that each of the data values of the information adding position image map data is equal to a value showing that no information is added or said state is satisfied even if attention is paid to an arbitrary pixel.

4. A method according to claim 3, wherein as a method of forming said information adding position image map data, whether said information adding position image map data is sequentially changed in accordance with the order of selecting the positions of the images where the information should be added or not is discriminated on the basis of the data value of said watermark core image data as a reference, if the value of said information adding position image map data at said image position to be subjected to said discrimination is equal to an initial state value, it is determined that the information can be added, the data value of said information adding position image map data is changed to a data value showing that the information is added, further, the position to be subjected to said discrimination is used as a reference, each of the data values of said information adding position image map data in said predetermined peripheral pixel range is changed to a data value showing that data exists at positions near said position, if the value of said information adding position image map data at the image position to be subjected to said discrimination is not equal to the initial state value, it is determined that the information cannot be added, and the data value of said information adding position image map data is not changed.

5. A method according to claim 2, wherein when said desired information to be added is expressed by a bit train of "0" and "1", said change amount image map data is formed from said bit train of "0" and "1" with reference to said information adding position image map data by a predetermined method.

6. A method according to claim 5, wherein in the process to form said change amount image map data from said bit train of "0" and "1" with reference to said information adding position image map data by the predetermined method, bit corresponding position image map data showing a correspondence such that the bit of which number from the first bit in said bit train of "0" and "1" becomes the information that is added to which image position is formed.

7. A method according to claim 1, wherein positive value addable image data and negative value addable image data are formed on the basis of said watermark core image data, and an averaging process of said positive value addable image data and said negative value addable image data is performed, thereby forming difference discrimination image data.

8. A method according to claim 7, wherein said change amount image data is formed on the basis of said desired information to be added with reference to said positive value addable image data and said negative value addable image data.

9. A method according to claim 1, wherein an edge preserving type image filtering process is used as said image filtering process.

10. A method according to claim 9, wherein a one-dimensional smoothing type filtering process in a minimum changing direction is used as said edge preserving type image filtering process.

11. A method according to claim 7, wherein when said watermark inserted image data or image data obtained by modifying said watermark inserted image data is used as watermark detecting image data, difference comparison image data is formed by performing a process to obtain a difference between said watermark detecting image data and said original image data, and a data value of said difference comparison image data and a data value of said difference discrimination image data are compared, thereby reading the information added to said watermark detecting image data.

12. A method according to claim 11, wherein with respect to the case where said bit corresponding position image map data disclosed in claim 6 is formed, when the data value of said difference comparison image data and the data value of said difference discrimination image data are compared, the bit corresponding position image map data is referred.

* * * * *